H. W. CAMPBELL.
CULTIVATOR.
APPLICATION FILED FEB. 28, 1918.

1,299,676.

Patented Apr. 8, 1919.
2 SHEETS—SHEET 1.

WITNESSES

INVENTOR
HARDY W. CAMPBELL
BY
ATTORNEYS

H. W. CAMPBELL.
CULTIVATOR.
APPLICATION FILED FEB. 28, 1918.

1,299,676.

Patented Apr. 8, 1919.
2 SHEETS—SHEET 2.

WITNESSES

INVENTOR
HARDY W. CAMPBELL
BY
ATTORNEYS

UNITED STATES PATENT OFFICE.

HARDY WEBSTER CAMPBELL, OF LINCOLN, NEBRASKA.

CULTIVATOR.

1,299,676.

Specification of Letters Patent. Patented Apr. 8, 1919.

Application filed February 28, 1918. Serial No. 219,657.

*To all whom it may concern:*

Be it known that I, HARDY W. CAMPBELL, a citizen of the United States, resident of Lincoln, county of Lancaster, State of Nebraska, have invented certain new and useful Improvements in Cultivators, of which the following is a specification.

In cultivating or tilling the soil, it has been customary to use cultivator teeth or little plows having such inclination or pitch with respect to the ground line that there was a tendency to throw the soil out laterally and pulverize it and this action, though not especially serious with the ordinary slow motion of a horse cultivator, became extremely noticeable and detrimental when an attempt was made to move the machine more rapidly, as by the power of a gas engine.

It has also been found that tools of the ordinary shape or pitch coming in contact with weeds or grass roots would frequently push them to one side or ride over them and, if the operator attempted to cut the weeds or roots by moving the machine more rapidly, it resulted in throwing out and pulverizing the soil to such an extent that the desired even soil mulsh could not be obtained.

It has also been found that when the soil is thrown laterally by the cultivators usually employed there will be a lack of uniformity in the depth of the mulsh or blanket and in consequence a less favorable condition to retain the moisture for the crop.

The primary object, therefore, of my invention is to provide a cultivator or tool by means of which the surface of the ground may be cultivated or tilled at a much higher speed than has usually been considered possible for the operation of machines of this type.

A further object is to provide a cultivator by means of which the top soil is lifted and the cultivator passed under it in such a way that the soil will flow backwardly over the tool and assume substantially the same position which it occupied before the passage of the tool except that the desired loosening of the soil is obtained and a destruction of grass roots and weeds effected.

A further object and an advantage arising from the lifting of the top soil instead of throwing it out laterally is the non-pulverizing action or the leaving of the somewhat unbroken lumps of soil in the mulsh blanket.

A further object is to provide a cultivating tool mounted to operate in the soil at such an angle or pitch that weeds, grass roots and the like will be thoroughly cut and destroyed.

A further object is to avoid the formation of ridges or trenches in the uncultivated part of the soil beneath the mulsh blanket in which the roots of the plants are growing and leave this soil as smooth and level as possible. This ridging or trenching of the soil is caused by the long downward prong of the tools generally used for cultivating purposes, which frequently destroys the plant roots and damages the crop. This difficulty is entirely avoided by the use of my improved cultivator.

The invention consists generally in various constructions and combinations, all as hereinafter described and particularly pointed out in the claims.

In the accompanying drawings forming part of this specification,

Figure 1:
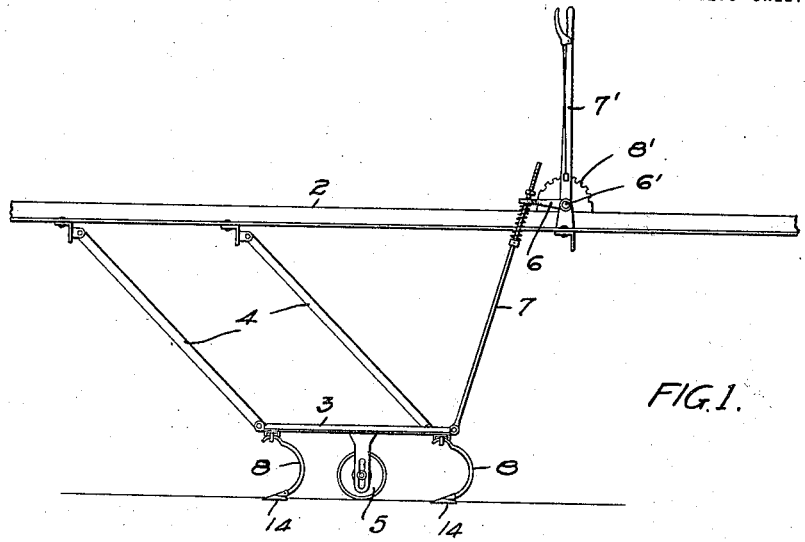
Figure 1 is a side elevation of a portion of a machine embodying my invention.
Figure 2:
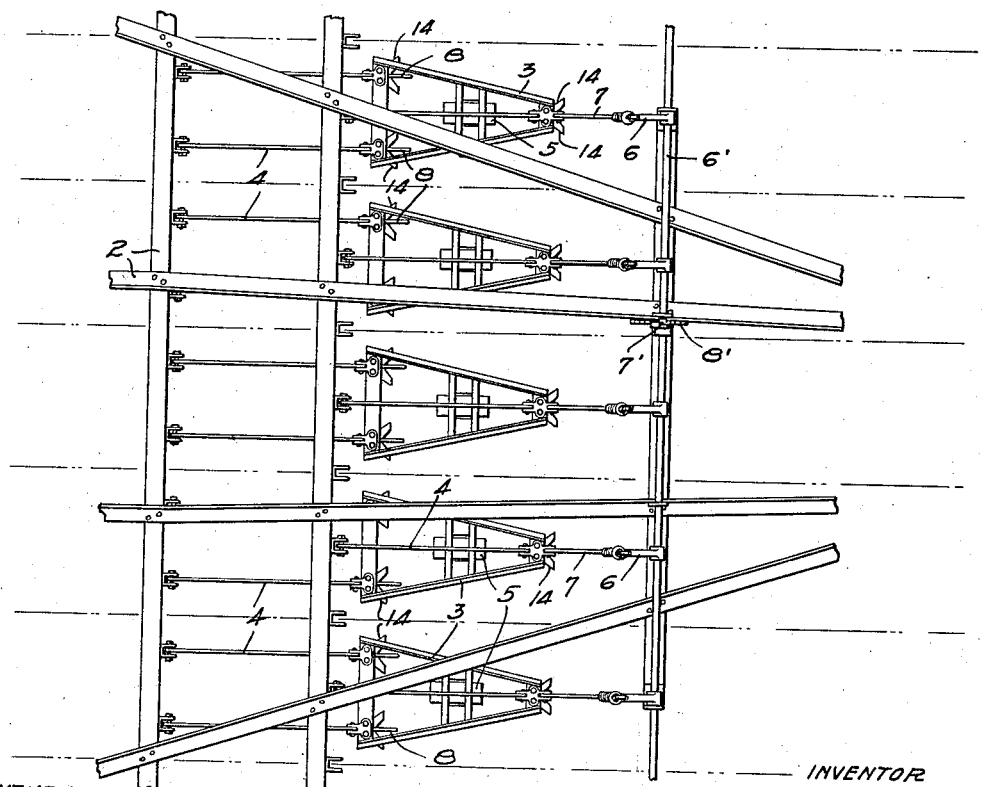
Fig. 2 is a plan view of the same.
Figure 3:
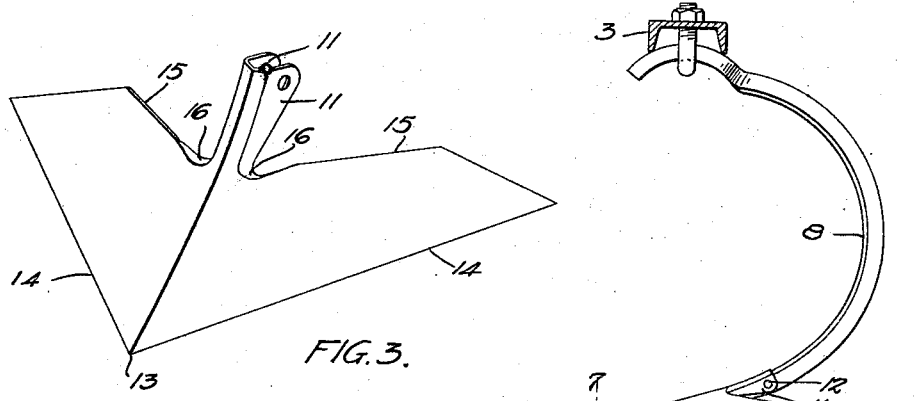
Fig. 3 is a perspective view of a cultivator tooth or tool embodying my invention.
Figure 4:
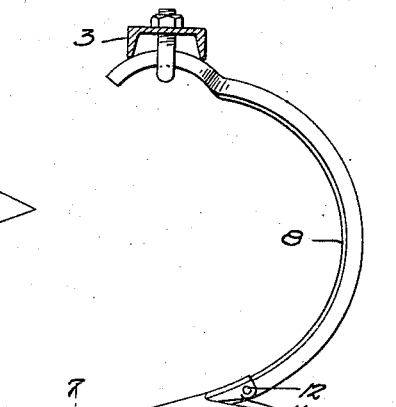
Fig. 4 is a side elevation of the same.

In the drawing, 2 represents a suitable frame in which my improved cultivators are mounted. 3 represents a secondary or supplemental frame pivotally connected with the main frame 2 by suitable bars or links 4, which allow the supplemental frame to be raised or lowered in the operation of the machine. The supplemental frame is preferably triangular in form and there may be a series of them arranged in parallel rows across the machine. I may provide five of these supplemental frames in a row, or a greater or less number, according to the desired capacity of the machine, and each supplemental frame operates between rows of grain or plants of any kind to be cultivated.

Each supplemental frame preferably has a vertically adjustable wheel 5 carried thereby by means of which the depth of travel of the cultivators may be regulated and for lifting the supplemental frames I provide levers 6 on a shaft 6' on the main frame having rod connections 7 with the supplemental frames. There may be any suitable number of cultivators mounted in the supplemental frames, depending upon the soil to be cultivated and kind of work desired, but I prefer to provide three of them, one at each angle of the frame, the two in front being opposite each other while the one in the rear covers the ground between the cultivators in front.

Figure 7:
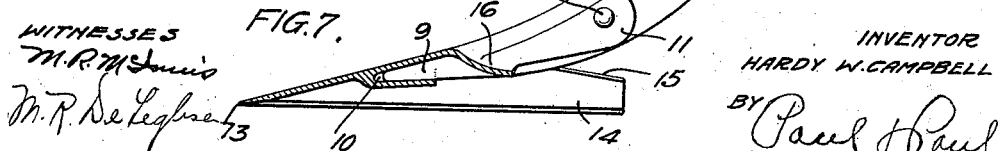
Fig. 7 is a sectional view on the line 7—7 of Fig. 5.

To the supplemental frame I attach supporting shanks 8 and referring to Fig. 7, the lower ends of these shanks are tapered, as at 9, to enter sockets 10 provided in the underside of the cultivators, while the tops of the cultivators have flanges 11 secured to the shanks by suitable means, such as bolts 12.

The shape of these cultivators allows the machine to be operated at a high speed without throwing the top soil or breaking up to any extent the lumps of the mulsh blanket and herein lies the important feature of my invention.

Figure 6:
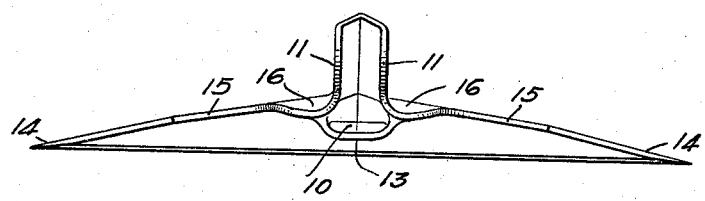
Fig. 6 is a rear view of the tooth.

The rear portion of the shovel, as shown in the drawings, Figs. 6 and 7, is drawn down at the center upon each side of the shank so that the throat or passage leading to the space beneath the arched portion of the shovel is narrowed or contracted and I have found that this contraction produces a suction on the soil as it passes over the rear of the shovel on each side of the shank, drawing it inwardly and downwardly and causing it to drop back in a mulsh or blanket of uniform depth in the rear of the shovel, and filling up the crevice usually left in the soil by the shank of the cultivator. I have found this suction or drawing action is emphasized or increased when the cultivator is moved rapidly through the soil, instead of throwing the soil outwardly and leaving it in ridges in the rear of the cultivator, as usual in tools of this kind when operated at either a slow or high speed. I am therefore able to increase the speed of my machine and cover a much larger area in a given time and by such increase I improve the action of the cultivator and leave the mulsh blanket in better condition to conserve the moisture in the root bed beneath than is possible with cultivators as ordinarily made.

In the cultivation of growing plants, I have found it undesirable to turn the soil over, as such action often tends to pulverize the mulsh too unevenly. I avoid this result by my specific type of shovel and therein lies a further distinct advantage.

Figure 5:
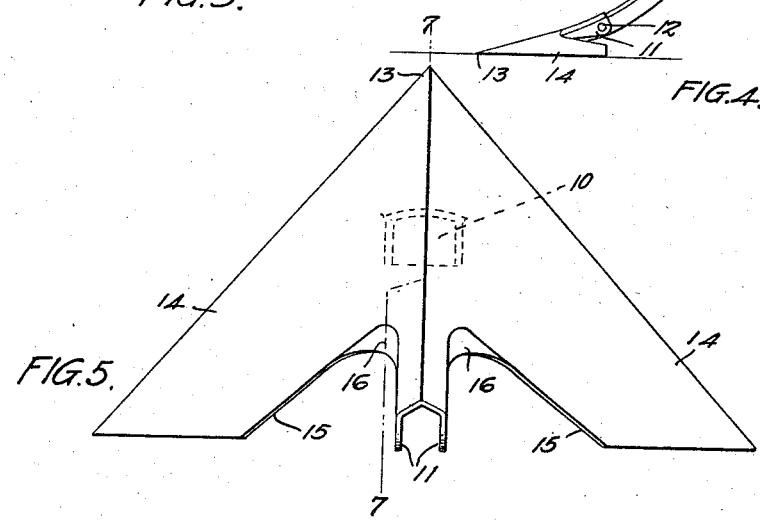
Fig. 5 is a plan view.

The cultivators are preferably triangular in form, made preferably of sheet metal with flat upper surfaces, as shown in Fig. 5, with tapering points 13 from which wings 14 extend outwardly and rearwardly in planes at a slight angle to the ground line, so that when the cultivators enter the soil they will slide along under the mulsh blanket allowing it to flow back over the rear portion of the wings when the machine is operating rapidly. The wings have forwardly extending recesses 15 on each side of the flanges 11 and the walls of the wings at the inner ends of the recesses are depressed or concaved, as shown at 16 in Fig. 6, to allow the soil to flow evenly and smoothly over the rear edge of the tool and form a mulsh blanket of uniform depth in the rear of the machine, while the broad lower edges of the cultivator form a substantially level bed under the mulsh blanket for the plant roots.

I am able in the operation of this tool to avoid breaking up the lumps of soil to such an extent as to cause too rapid drying out of the firm subsoil, which will take place usually when the soil is thrown out and pulverized by the ordinary type of cultivator. My improved cultivator blades, passing through the top soil in a plane almost parallel with the ground line, will merely lift the surface soil sufficiently for proper cultivation of the plants and destruction of the weeds and grass, while the lifting and loosening of this surface soil tends to produce a drying out process in the mulsh blanket which will prevent the upward capillary movement of the soil moisture contained in the firm soil beneath. I am thus able to provide a firm even root bed for the plants with a top mulsh or blanket of loose soil which will dry out and prevent the loss of the needed moisture in the soil beneath. I am able with my improved machine to form a mulsh, as above described, and destroy the weeds and grass roots and at the same time operate the machine at a much faster speed than heretofore has been considered practicable.

I have also found that where the cultivator blades are set at the angle shown herein, the resistance to rapid movement of the machine through the soil will be greatly reduced and the speed can be materially increased without additional power, with a corresponding increase in acreage covered without the resulting objections heretofore described. This increased acreage and the improvement in cultivation is of particular importance in these times, owing to the growing scarcity of labor and the fact that the needs of the country demand a higher degree of cultivation and an increased production with a proportionate decrease of labor.

The operation of the machine, briefly, is as follows: The cultivators or plows having been set for the desired depth of mulsh blanket, the machine is started across the field at a speed impossible with an ordinary cultivator without throwing the soil from side to side and cutting trenches or furrows in the root bed. As the cultivators are moved along at this increased speed, their angle or pitch with respect to the soil in which they are working will be such that a thin layer or blanket of the top soil will flow backwardly over the rear of the tools undisturbed, substantially, by the passage thereof except to obtain the desired loosening effect and without breaking up to any appreciable extent the lumps of soil on the surface. The broad lower edges of the tools will glide along under the surface, leaving a substantially level bed under the blanket which may be permeated by the plant roots without danger of being cut or destroyed by the edges of the cultivators. When the character of condition of the soil demands, the cultivators may be raised or lowered to decrease or increase the depth of the blanket. As heretofore stated, the machine may be made of any suitable width and any desired number of cultivators may be mounted in each supplemental frame.

I claim as my invention:

1. A cultivator having its edges converging from its rear toward its forward end and provided with a supporting shank in the rear of the middle portion thereof, said cultivator being arched in front of said shank and the middle portion of said cultivator in the rear of said arch being drawn downwardly to contract or narrow the throat leading to the space beneath said arch, whereby a suction is created and the soil passing over the edge of the cultivator deposited in a mulsh of uniform depth.

2. A cultivator comprising a blade having cutting edges, said blade having an arched forward portion and a shank in the rear of said arched portion, the wall of said blade in the rear of said arched portion being drawn downwardly to contract or narrow the throat or passage leading to the space beneath said arched portion, the contraction of said throat producing a suction at the rear edge of said blade and directing the soil thereover in a uniform sheet to form a mulsh blanket of even depth.

3. A cultivator blade having laterally projecting wings with edges converging from the rear toward the front and downwardly inclined slightly toward said edges from the middle portion of said blade, said wings having a socket to receive a supporting shank with recesses upon opposite sides of said socket and concave surfaces upon each side of said socket leading to said recesses, and over which concave surfaces the top soil is directed by said blade.

In witness whereof, I have hereunto set my hand this 2nd day of February, 1918.

HARDY WEBSTER CAMPBELL.

Copies of this patent may be obtained for five cents each, by addressing the "Commissioner of Patents, Washington, D. C."